(12) United States Patent
Wagenblast et al.

(10) Patent No.: US 8,187,373 B2
(45) Date of Patent: May 29, 2012

(54) PRINTING INKS FOR OFFSET AND/OR HIGH PRINTING CONTAINING NIR ABSORBERS AND NIR ABSORBERS SOLUBLE IN OFFSET AND/OR HIGH PRINTING INKS

(75) Inventors: Gerhard Wagenblast, Wachenheim (DE); Helmut Reichelt, Neustadt (DE); Michael Büschel, Ludwigshafen (DE); Sylke Haremza, Neckargemünd (DE); Peter Erk, Frankenthal (DE); Erich Frank, Goeppingen (DE)

(73) Assignees: BASF SE (DE); Flint Group Germany GmbH (DE)

( * ) Notice: Subject to any disclaimer, the term of this patent is extended or adjusted under 35 U.S.C. 154(b) by 0 days.

(21) Appl. No.: 12/950,529

(22) Filed: Nov. 19, 2010

(65) Prior Publication Data
US 2011/0064884 A1 Mar. 17, 2011

Related U.S. Application Data

(62) Division of application No. 10/591,250, filed as application No. PCT/EP2005/002174 on Mar. 2, 2005, now Pat. No. 7,901,494.

(30) Foreign Application Priority Data

Mar. 5, 2004 (DE) .......................... 10 2004 011 347

(51) Int. Cl.
C09D 11/02 (2006.01)
(52) U.S. Cl. .................................. 106/31.32; 106/31.64
(58) Field of Classification Search ............... 106/31.32, 106/31.64
See application file for complete search history.

(56) References Cited

U.S. PATENT DOCUMENTS

| 5,013,642 | A | 5/1991 | Muenter et al. |
| 5,607,803 | A * | 3/1997 | Murofushi et al. ........ 430/108.1 |
| 6,048,387 | A | 4/2000 | Shibahashi et al. |
| 6,857,368 | B2 | 2/2005 | Pitz |

FOREIGN PATENT DOCUMENTS

| DE | 3721850 A1 | 1/1989 |
| DE | 4308635 A1 | 9/1994 |
| EP | 342576 A1 | 11/1989 |
| EP | 355473 A2 | 2/1990 |
| EP | 445627 A1 | 9/1991 |
| EP | 468465 A1 | 1/1992 |
| EP | 627660 | 12/1994 |
| EP | 1302735 A2 | 4/2003 |
| EP | 1308485 | 5/2003 |
| EP | 1359008 | 11/2003 |
| EP | 1403333 A1 * | 3/2004 |
| JP | A-05-59290 | 3/1993 |
| JP | 05-338356 | 12/1993 |
| JP | A-09-249811 | 9/1997 |
| JP | A-2003-1953 | 1/2003 |
| WO | WO 03/038001 A1 * | 5/2003 |
| WO | WO-03/066338 | 8/2003 |
| WO | WO-03/076518 A2 | 9/2003 |

OTHER PUBLICATIONS

English-language translation of international Preliminary Report on Patentability of PCT/EP2005/002174 issued Jun. 2, 2006.

* cited by examiner

Primary Examiner — Jerry Lorengo
Assistant Examiner — Veronica F Faison
(74) Attorney, Agent, or Firm — Connolly Bove Lodge & Hutz LLP

(57) ABSTRACT

Printing inks for offset and/or letterpress printing which comprise NIR absorbers, and solubility of the NIR absorber in the printing ink is at least 0.1% by weight. NIR absorbers consisting of cyanine cation with an anion which has long-chain alkyl or aralkyl groups. Use of such printing inks for printing processes in which the curing of the printing ink is promoted by using IR lasers. NIR absorbers comprising a cyanine cation with an anion which has long-chain alkyl or aralkyl groups.

8 Claims, No Drawings

PRINTING INKS FOR OFFSET AND/OR HIGH PRINTING CONTAINING NIR ABSORBERS AND NIR ABSORBERS SOLUBLE IN OFFSET AND/OR HIGH PRINTING INKS

CROSS REFERENCE TO RELATED APPLICATIONS

This application is a divisional of U.S. application Ser. No. 10/591,250, filed Jun. 21, 2007, which is a the National Stage of International Application No. PCT/EP2005/002174 filed on Mar. 2, 2005; and this application claims priority of Application. No. 102004011347.5 filed in Germany on Mar. 5, 2004; the entire contents of all are hereby incorporated by reference.

The present invention relates to printing inks for offset and/or letterpress printing which comprise NIR absorbers and where the solubility of the NIR absorber in the printing ink is at least 0.1% by weight. In a particular embodiment, the NIR absorber comprises a cyanine cation with an anion which has long-chain alkyl or alkylaryl groups. The invention furthermore relates to the use of such printing inks in printing processes in which the curing of the printing ink is promoted by using IR radiation sources. In a further aspect, the invention relates to an NIR absorber comprising a cyanine cation with an anion which has long-chain alkyl or alkylaryl groups.

Curing or drying of printing inks is understood by a person skilled in the art as meaning the entire group of operations, reaction sequences and transformations which take place in the transformation of the printing ink freshly applied to the print medium into a solid film adhering well to the substrate. Substantial processes here are—in the case of an absorptive print medium—the penetration of the solvent into the print medium, the evaporation of the solvent and the crosslinking of the film, for example oxidatively by means of atmospheric oxygen or by a free radical or cationic method by means of suitable crosslinking agents.

Faster curing permits faster printing and thus increases the cost-efficiency. It is known that the curing of printing inks can also be accelerated by supplying heat. For this purpose, for example, the freshly printed print medium can be passed through a drying tunnel and heated with hot air and/or IR emitters. The procedure is usual, particularly in offset printing, because offset printing inks comprise very high-boiling solvents which exhibit virtually no evaporation at room temperature. For example, the heatset (roll) offset method is widely used. Further details in this context are to be found, for example, in Römpp-Lexikon "*Lacke and Druckfarben*", Georg Thieme Verlag, Stuttgart, New York 1998, page 279/280.

IR emitters generally emit broad-band radiation both in the near and in the middle infrared range. As an alternative to the use of IR emitters, EP-A 355 473 or EP-A 1 302 735 has proposed the use of lasers, in particular IR lasers, for heating the print layer. Conventional IR lasers emit in particular in the near infrared. Of course, the curing of the printing ink layer with IR radiation is all the better the higher the power density of the radiation. This is why lasers are particularly suitable.

Disadvantageously, however, the IR radiation is absorbed not only by the printing ink on the print medium but also by the paper. In particular, water is important as an IR absorber in the paper. Small amounts of water are always present in the paper, for example as a result of absorption of atmospheric humidity. Furthermore, water also enters the paper via the fountain solution used for offset printing. If the paper is heated excessively due to strong absorption and dries out nonuniformly, it may become wavy in an undesired manner.

This problem has been discussed in more detail, for example in sections [0010], [0011] and [0012] in EP-A 1 302 735.

In order to solve the problem, EP-A 1 302 735 proposed using radiation energy sources which emit at a wavelength which is substantially not absorbed by water. In order nevertheless to ensure sufficient absorption of the IR radiation in the printing ink layer, it was proposed to use printing inks which comprise an absorber for NIR radiation. Only two cyanine dyes in the form of the perchlorate and tetrafluoroborate, an a minimum compound in the form of the perchlorate and a nickel-dithiolene complex were mentioned specifically.

Cyanine dyes and their preparation are known in principle, for example from DE-A 37 21 850, and they have been proposed for a very wide range of applications, for example for photographic materials (U.S. Pat. No. 5,013,642, EP-A 342 576, EP-A 445 627), ink ribbons (DE 43 08 635) or printing plates (WO 03/66338). Cyanine dyes are commercially available.

Cyanine dyes consist of a cyanine cation and a corresponding anion. This may be an anion which is present separately or an internal anion, i.e. the anionic group is chemically bonded to the cyanine cation. In their preparation, they are usually obtained as simple salts, for example as halides, tetrafluoroborates, perchlorates or tosylates. Cyanine dyes having anions which have long-chain alkyl groups or alkyl-substituted aryl groups have been unknown to date.

However, the use of said simple salts in offset printing inks leads to problems. If a sufficient amount of the NIR absorbers are stirred into the printing inks, the hue of the offset printing ink changes. This effect is highly undesirable since the tristimulus values of a set of printing inks, yellow, cyan, magenta and black, for high-quality four-color printing are tailored to one another with high precision and specified by means of international standards. Even very small deviations from the CIE coordinates are no longer acceptable in high-quality offset printing. The change in the hue is most noticeable in the case of yellow, which becomes dull on addition of such NIR absorbers and acquires a brownish-greenish tinge. Such a yellow is completely unusable.

The change in the hues appears to be caused at least partly by insufficient solubility of the dyes in the offset printing inks. The solubility of conventional cyanine dyes in the nonpolar, viscous solvents which are used for offset and letterpress inks is as a rule less than 0.1%.

It was therefore an object of the invention to provide improved printing inks for offset and/or letterpress printing which comprise NIR absorbers and where the disadvantages of the prior art are not observed. It was a further object to provide NIR absorbers which are suitable for the preparation of printing inks for offset and/or letterpress printing and which can be stirred into the printing inks and, in the printing ink, lead to a sufficiently high extinction in the case of certain wavelengths typical for lasers, without any substantial impairment of the tristimulus values of the printing ink occurring.

Accordingly, offset printing inks which comprise NIR absorbers have been found, and the solubility of the NIR absorber in the ink is at least 0.1% by weight, the solubility of the NIR absorber being greater than or equal to the respective concentration of the NIR absorber in the printing ink.

In a preferred embodiment of the invention, the NIR absorber is an ionic absorber comprising a cyanine cation $X^+$ and a corresponding anion $1/mY^{m-}$, the cyanine cation having a general formula (I) or (II)

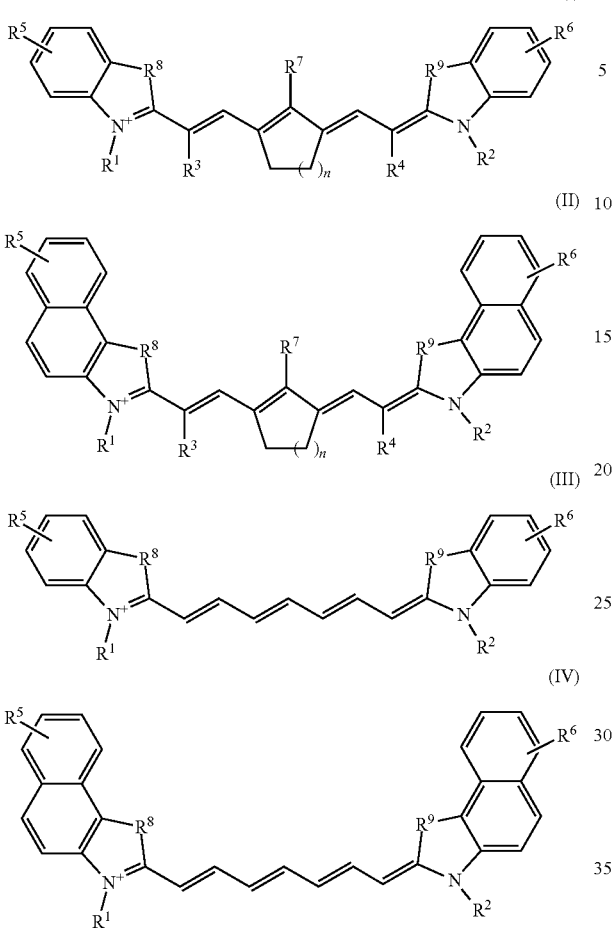

(I), (II), (III), (IV)

n is 1 or 2 and the radicals $R^1$ to $R^9$ have the following meanings:

$R^1$ and $R^2$, independently of one another, are a linear or branched, optionally further substituted alkyl or aralkyl radical having 1 to 20 carbon atoms, $R^3$ and $R^4$, independently of one another, are H or CN, $R^5$ and $R^6$, independently of one another, are one or more, identical or different substituents selected from the group consisting of —H, —F, —Cl, —Br, —I, —NO$_2$, —CN, —CF$_3$, —$R^1$, —$OR^1$, aryl- or —O-aryl, $R^7$ is —H, —Cl, —Br, —I, -phenyl, —O-phenyl, —S-phenyl, —N(phenyl)$_2$, -pyridyl, a barbituric acid radical or a dimedone radical, it also being possible for the phenyl radicals to be further substituted, $R^8$ and $R^9$, independently of one another, are >C(CH$_3$)$_2$, —O—, —S—, >$NR^1$ or —CH=CH—, and the anion $Y^{m-}$ has the general formula $[AR^{10}{}_k]^{m-}$ with a polar, ionic head group A and k nonpolar groups $R^{10}$, k is 1, 2 or 3 and m is 1 or 2, and the nonpolar groups $R^{10}$, independently of one another, are selected from the group consisting of linear, branched or cyclic alkyl groups having 6 to 30 carbon atoms and alkylaryl groups of the general formula -aryl-$R^{11}$, where $R^{11}$ is a linear or branched alkyl group having 3 to 30 carbon atoms, or the anion $Y^{m-}$ is a borate anion of the general formulae (V) or (VI)

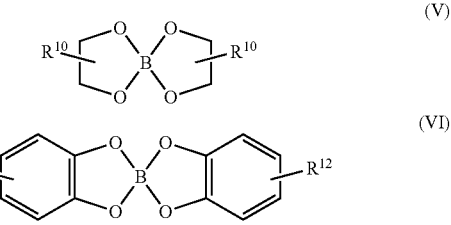

(V), (VI)

where $R^{10}$ is as defined above and $R^{12}$ is at least one substituent selected from the group consisting of H and linear, cyclic or branched alkyl groups having 1 to 20 carbon atoms, and in the radicals $R^{10}$, $R^{11}$ and $R^{12}$, even nonneighboring carbon atoms may optionally be substituted by O atoms and/or the radicals $R^{10}$, $R^{11}$ and $R^{12}$ may be completely or partly fluorinated, with the proviso that the nonpolar character of the group is not substantially influenced thereby.

Novel NIR absorbers of the type described have furthermore been found.

Regarding the invention, the following may be stated specifically:

The novel offset printing inks comprise, in a manner known in principle, at least one nonpolar solvent, a binder and a colorant absorbing in the visible spectral range. In addition, conventional additives may be present.

The terms "offset printing ink" and "letterpress printing ink" are self-explanatory and at the same time limiting. Letterpress printing inks are also known as relief printing inks. Offset and letterpress printing inks are in each case pasty printing inks which comprise high-boiling, nonpolar solvents, as a rule having a boiling point of about 200° C. to about 320° C. The general principles for the formulation of offset and letterpress printing inks are known to a person skilled in the art and are described, for example, in reference works such as Römpp-Lexikon "*Lacke and Druckfarben*", Georg Thieme Verlag, Stuttgart, New York 1998, or Leach, Robert H.; Pierce, Ray J. "*The Printing Ink Manual*", 5th Ed.—London, Blueprint, 1993.

The novel printing inks can in principle be all types of offset and/or letterpress printing inks. However, a heatset offset printing ink is preferred.

The novel printing ink comprises, in a manner known in principle, at least one nonpolar, high-boiling solvent. Of course, mixtures of different solvents may also be used provided that the properties of the printing inks are not adversely affected thereby. Examples of suitable solvents comprise mineral oils, in particular low-aromatics mineral oils. The boiling point of the mineral oil depends on the desired use and is chosen accordingly by a person skilled in the art. In general, a boiling point of about 200° C. to about 270° C. is advisable for heatset offset printing, and a boiling point of about 240° C. to 320° C. for coldset offset printing and letterpress printing. Further examples comprise vegetable, semidrying or drying oils, such as, for example, soybean oil, wood oil, tall oil or linseed oil. Such oils are suitable in particular for sheet-fed offset and letterpress printing inks. They are preferably used as a mixture with mineral oils.

The person skilled in the art makes a suitable choice from the solvents depending on the desired properties of the printing ink. The same applies to the amount of the solvent used. In particular, amounts of from 5 to 45% by weight, based on the amount of all components of the printing ink, of solvent have proven useful, without there being any intention to limit the invention thereto.

The novel printing inks furthermore comprise, in a manner known in principle, at least one binder. Mixtures of different binders are preferably used, for example mixtures of hard resins and soft resins. The conventional binders typical for offset and letterpress printing inks may be used. Examples of suitable binders comprise alkyd resins, natural resins, such as rosins, which may also be modified, such as, for example, phenol- or maleate-modified rosins, or synthetic resins, such as, for example, coumarone, indene or cyclopentadiene resins. Depending on the application, amounts of from about 20 to 70% by weight, based on the amount of all components of the printing ink, have proven useful, without there being any intention to limit the invention thereto. The person skilled in the art suitably chooses the type and amount of the binder according to the desired properties of the printing ink.

The novel printing ink furthermore comprises colorants absorbing in the visible spectral range. The conventional colorants known for offset and letterpress printing inks, in particular conventional pigments, may be used. Examples are inorganic pigments, such as, for example, titanium dioxide pigments or iron oxide pigments, interference pigments, carbon blacks, and organic pigments, such as azo, phthalocyanine and isoindoline pigments. The colorants may also be soluble organic dyes. It is of course also possible to use mixtures of different colorants. The amount of colorant is usually 5-25% by weight, based on the sum of all components of the printing ink.

The novel printing inks can optionally comprise, in a manner known in principle, one or more assistants or additives. Examples of additives and assistants are fillers, such as calcium carbonate, hydrated aluminum oxide or aluminum or magnesium silicate. Waxes increase the abrasion resistance and serve for reducing the blocking resistance. Examples are in particular polyethylene waxes, oxidized polyethylene waxes, petroleum waxes or ceresin waxes. Fatty acid amides can be used for increasing the surface smoothness. Dispersants can be used for dispersing the pigments. Cobalt or manganese salts, i.e. drying agents, can be used for accelerating oxidative curing. The total amount of all additives and assistants usually does not exceed 20% by weight, based on the sum of all components, and is preferably 0.1-10% by weight.

According to the invention, the printing inks for letterpress and/or offset printing further comprise at least one NIR absorber which has substantially no absorption in the visible spectral range. It is of course also possible to use a plurality of different NIR absorbers.

NIR absorbers are also referred to by a person skilled in the art as NIR dyes or, more generally, as IR dyes. Such dyes or absorbers have absorption maxima in the spectral range from 700 nm to 3000 nm, preferably from 750 nm to 2000 nm, particularly preferably from 780 nm to 1500 nm.

In the context of this invention, the term "substantially no absorption in the visible spectral range" is intended to mean that the absorber should ideally have no absorption at all in the visible spectral range. For the purposes of this invention, however, it is sufficient if the absorption of the NIR absorber—in the chosen amounts—in the visible spectral range is so low that the color impression of the printing ink is not adversely affected. Of course, this also depends on the hue and on the color strength of the respective printing ink. An NIR absorber which is no longer suitable for a printing ink having a very specific hue and a very specific color strength may in certain circumstances be entirely suitable for another printing ink having another hue and another color strength.

According to the invention, the solubility of the NIR absorber in the printing ink is at least 0.1% by weight, based on the sum of all components of the ink, with the proviso that the solubility of the NIR absorber is greater than or equal to the concentration of the NIR absorber in the printing ink.

In other words, it must be ensured according to the invention that added IR absorber is completely dissolved in the printing ink. The larger the added amount of the NIR absorber, the greater must also the solubility of the added NIR absorber be. Depending on the desired amount of IR absorber, the person skilled in the art makes a suitable choice from the NIR absorbers possible in principle, taking particular account of the solubility thereof. The solubility can of course also depend on the printing ink. An NIR absorber which is not sufficiently soluble in a specific printing ink may have sufficient solubility in another one.

The type and amount of the NIR absorber present in the novel printing ink is chosen by a person skilled in the art so that sufficient absorption at the desired laser wavelength is achieved. As a rule, an amount of less than 5% by weight is sufficient. An amount of from 0.05 to 4% by weight, based on all components of the printing ink, preferably from 0.1 to 3% by weight, particularly preferably from 0.2 to 2.5% by weight and very particularly preferably from 0.3 to 2.0% by weight, has proven particularly useful.

The solubility of the NIR absorber in the printing ink is preferably at least 0.2% by weight, particularly preferably at least 0.5% by weight, very particularly preferably at least 1.0% by weight and, for example, at least 2% by weight.

As a rule, it is advisable not to increase the amount of added NIR absorber to the solubility limit but to remain a certain distance away from the solubility limit.

Any desired NIR absorbers can be used by a person skilled in the art for the preparation of the printing ink, provided that the NIR absorber has the required solubility. However, the NIR absorber is preferably at least one NIR absorber selected from the group consisting of the cyanines, naphthalocyanines, squaraines and croconates.

In a particularly preferred embodiment of the invention, the NIR absorber is an ionic absorber comprising a cyanine cation $X^+$ and a corresponding anion $1/mY^{m-}$, where m can assume in particular the values 1 or 2.

The cyanine cation according to the invention has a general formula selected from the following formulae (I) to (IV):

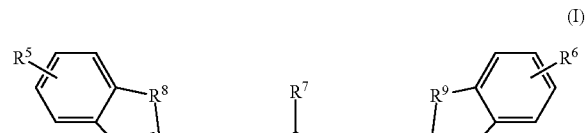

(I)

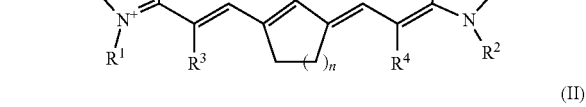

(II)

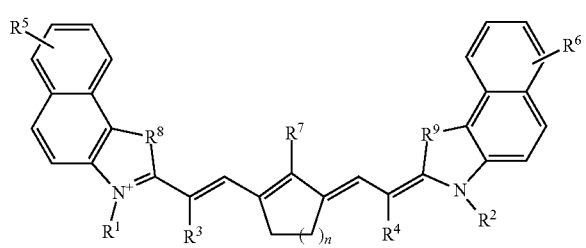

-continued

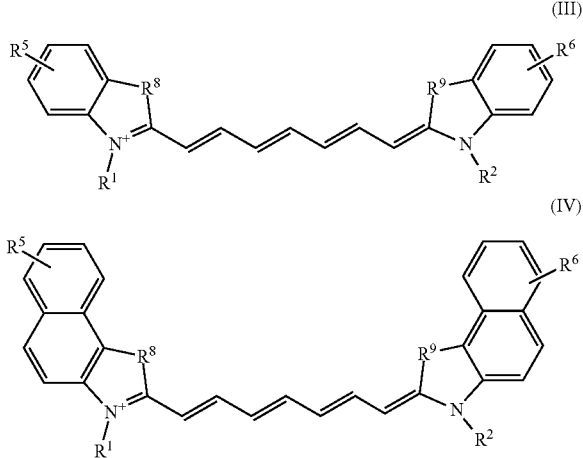

Here, n is 1 or 2, and the radicals $R^1$ to $R^9$ have the following meanings:

$R^1$ and $R^2$, independently of one another, are a linear or branched alkyl or aralkyl radical having 1 to 20 carbon atoms. Examples comprise methyl, ethyl, 1-propyl, 2-propyl, 1-butyl, 2-butyl, tert-butyl, 1-pentyl, 1-hexyl, 2-ethyl-1-hexyl, 1-octyl, 1-decyl or 1-dodecyl groups. In particular, they are linear alkyl groups. Preferred radicals are methyl, ethyl, 1-butyl or 1-dodecyl groups. Aralkyl groups are, in a manner known in principle, alkyl groups substituted by aryl groups. Examples comprise a benzyl or phenylethyl group. $R^1$ and $R^2$ may be identical or different from one another. $R^1$ and $R^2$ are preferably identical radicals.

$R^1$ and $R^2$ may optionally be further substituted. In particular, functional groups, such as, for example, amino or hydroxyl groups, may be mentioned here. If present, they may be in particular functional groups arranged terminally on alkyl groups.

$R^3$ and $R^4$, independently of one another, are —H or —CN. $R^3$ and $R^4$ are preferably the same group.

The radicals $R^5$ and $R^6$ are different or, preferably identical radicals selected from the group consisting of —H, —F, —Cl, —Br, —I, —NO$_2$, —CN or —CF$_3$. $R^5$ and $R^6$ may also be a radical —$R^1$ or —O$R^1$, where $R^1$ in each case has the above meaning. Furthermore, they may be aryl or —O-aryl radicals, aryl preferably being a phenyl radical. $R^5$ and $R^6$ are preferably —H, —Cl, —Br or —I or an alkyl radical. The terminal rings may each also have a plurality of identical or different substituents $R^5$ or $R^6$ at different positions of the ring.

Preferably not more than two substituents are present on each ring, particularly preferably only one substituent in each case.

$R^7$ may be —H, —Cl, —Br, —I, -phenyl, —O-phenyl, —S-phenyl, —N(phenyl)$_2$, -pyridyl, a barbituric acid radical or a dimedone radical, it also being possible for the phenyl radicals to be further substituted. Further substituents may be, for example, straight-chain or branched alkyl radicals, for example methyl or ethyl radicals, or —F, —Cl, —Br, —I, —NO$_2$, —CN or —CF$_3$.

The radicals $R^8$ and $R^9$ are different or, preferably, identical radicals selected from the group consisting of >C(CH$_3$)$_2$, —S—, >N$R^1$ or —CH=CH—. They are particularly preferably >C(CH$_3$)$_2$.

The opposite ion $Y^{m-}$ to the cyanine cation may have the general formula $[AR^{10}_k]^{m-}$. It comprises a polar, ionic head group A and k nonpolar groups $R^{10}$, where k is 1, 2 or 3 and m is 1 or 2. The anion preferably has only one group $R^{10}$. It is furthermore preferably a monovalent anion. If a plurality of nonpolar groups $R^{10}$ are present in the anion, they may be different or, preferably, identical. Of course, a mixture of a plurality of different anions is also possible.

The groups $R^{10}$ may be linear, branched or cyclic alkyl groups having 6 to 30 carbon atoms. The alkyl groups $R^{10}$ preferably have 6 to 12 carbon atoms. Examples of suitable groups comprise 1-hexyl, cyclohexyl, 2-ethyl-1-hexyl, 1-octyl, 1-nonyl, 1-decyl, 1-undecyl, 1-dodecyl or 1-tetradecyl groups. They are preferably linear alkyl groups.

They may furthermore be alkylaryl groups of the general formula -aryl-$R^{11}$, $R^{11}$ being a linear or branched alkyl group having 3 to 30 carbon atoms. Examples of suitable groups comprise 1-propyl, 2-propyl, 1-butyl, 2-butyl, tert-butyl, 1-pentyl, 1-hexyl, cyclohexyl, 2-ethyl-1-hexyl, 1-octyl, 1-nonyl, 1-decyl, 1-undecyl, 1-dodecyl- or 1-tetradecyl groups. The alky groups $R^{11}$ preferably have 6 to 12 carbon atoms. They are particularly preferably linear alkyl groups. The aryl unit is in particular a phenylene group, preferably a 1,4-phenylene group. Examples of suitable alkylaryl groups comprise —(C$_6$H$_4$)—C$_3$H$_7$, —(C$_6$H$_4$)—C$_6$H$_{13}$ or —(C$_6$H$_4$)—C$_{12}$H$_{25}$.

The polar ionic head group A is in particular the anion of a monobasic or dibasic acid radical. It may also be any desired inorganic or organic acid group. It is preferably a carboxyl group or a S-, P- or B-containing acid group. For example, it may be an acid group selected from the group consisting of —SO$_3^-$, —OSO$_3^-$, —COO$^-$, —PO$_3^{2-}$, —OPO$_3^{2-}$ or (—O)(—O)PO$_2^-$.

Examples of particularly suitable anions comprise alkanesulfonates having alkyl radicals, in particular linear alkyl radicals of 6 to 12 carbon atoms, such as, for example, n-octanesulfonate, n-decanesulfonate or n-dodecanesulfonate, and 4-alkylbenzenesulfonates having alkyl radicals of 6 to 12 carbon atoms, such as, for example, 4-hexylbenzenesulfonate, 4-octylbenzenesulfonate, 4-decylbenzenesulfonate or 4-dodecylbenzenesulfonate. These may also be, in a manner known in principle, industrial products which have a distribution of different alkyl radicals of different lengths.

The opposite ion $Y^{m-}$ for the cyanine cation may also be a borate anion of the general formula (V) or (VI)

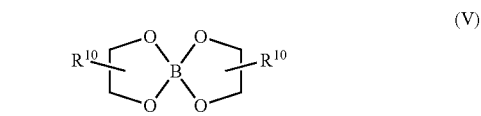

(V)

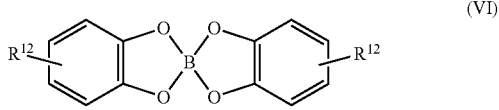

(VI)

$R^{10}$ is a radical as defined above. It is possible in each case for one or two identical or different substituents to be present on each of the chelate ligands. Preferably, in each case one substituent is present. $R^{12}$ comprises in each case one or more identical or different substituents selected from the group consisting of H or linear, cyclic or branched alkyl groups having 1 to 20 carbon atoms, preferably a radical having 2 to 12 carbon atoms. Preferably, only one alkyl group is present as a substituent. Such borate anions are obtainable, for example, from boric acid and the corresponding dialcohol.

In the radicals $R^{10}$, $R^{11}$ and $R^{12}$, it is also possible for nonneighboring carbon atoms optionally to be substituted by O atoms and/or for the radicals $R^{10}$, $R^{11}$ and $R^{12}$ to be completely or partly fluorinated, provided that the nonpolar character of the groups is not substantially changed thereby.

The preparation of the novel NIR absorbers can be effected by means of different methods. They can be prepared, for example, by means of a two-stage process in which, in a first step, the cyanine cations are synthesized with conventional anions, such as iodide, tetrafluoroborate, perchlorate or para-toluenesulfonate. Preparation methods are known to a person skilled in the art. As an example, reference may be made to DE-A 37 21 850, EP-A 627 660 and the literature cited there. NIR absorbers based on cyanine are also commercially available.

In a second step, the conventional anions are then exchanged for the novel anions $Y^{m-}$ by means of a suitable method.

This can be effected, for example, by initially taking the starting material together with the corresponding acid $H_mY$ in a water-immiscible organic solvent, there being no need for the absorber to be soluble therein. Readily volatile organic solvents having a certain polarity are particularly suitable. For example, said solvent may be dichloromethane. The organic solution or suspension is then extracted with water until the original anion has been completely removed from the organic solution. The novel NIR absorber can be obtained by removing the solvent from the solution.

The preparation can also be carried out using acidic ion exchange resins by dissolving the starting salt having a conventional anion in a suitable polar solvent, for example an alcohol, such as methanol or ethanol, and adding the solution to the ion exchange column. The absorber cations are then eluted with a solution of the desired anion. The ion exchange can also be effected similarly to the process disclosed by WO 03/76518.

The novel NIR absorbers are readily soluble in offset printing inks. The solubility can be influenced by the choice of the anion and of the substituents on the cation. Relatively long alkyl chains as groups $R^{10}$, $R^{11}$ or $R^{12}$ or as substituents on the cyanine generally also lead to better solubility.

The novel NIR absorbers have absorption maxima in the range from 700 nm to 1200 nm. Those dyes which have their absorption maximum close to the emission wavelength of conventional lasers, in particular semiconductor diode lasers, are preferred. Examples of typical laser wavelengths comprise 750 nm, 785 nm, 810 nm, 835 nm, 855 nm, 955 nm, 980 nm, preferably 810 nm and 980 nm. The absorption maximum of the NIR absorber can be influenced by a person skilled in the art in a manner known in principle, by the choice of the substituents on the cyanine cation.

As already described at the outset, the novel NIR absorbers have substantially no absorption in the visible spectral range. The extinction coefficient in the range from 400 to 700 nm is generally less than 20%, preferably less than 10% and particularly preferably less than 5% of the extinction coefficient at the incident laser wavelength.

Since, owing to their high mass-specific extinction coefficients, the novel NIR absorbers advantageously have to be used only in small amounts in order to achieve the desired effects, the hue of the printing ink is not changed or at least substantially not changed by the addition of the NIR absorbers.

The preparation of the novel letterpress or offset printing ink has no particular features at all. It can be effected by the methods known in principle, by thorough mixing or dispersing of the components in conventional apparatuses, such as, for example, dissolvers, stirred ball mills or a three-roll mill. Here, the NIR absorbers can be mixed in like other additives in the course of the preparation and dissolved in the printing ink.

It is also possible to mix the novel NIR absorbers into prepared, commercial offset or letterpress printing inks. Here, it is advisable as a' rule to predissolve the novel absorbers in a small amount of mineral oil and to add them as a concentrate to the offset ink.

By means of the novel NIR absorbers, printing inks are obtained which comprise a sufficient amount of NIR absorber in dissolved form and in which the hue of the printing ink is nevertheless not changed or at least substantially not changed in comparison with that of a printing ink without such an NIR absorber.

The printing inks can in principle be used for all techniques of letterpress or offset printing. They are of course particularly suitable for all printing techniques in which the drying of the ink is promoted by means of IR radiation, in particular heatset offset printing. By means of the IR absorber, very rapid drying of the printing ink applied to the print medium is achieved.

The IR radiation used for the drying may be either broadband radiation, narrowband radiation or laser radiation having a very specific wavelength. Particularly suitable lasers are the known lasers emitting in the NIR range, for example semiconductor diode laser or solid-state lasers, such as, for example, Nd/YAG lasers.

The novel printing inks are particularly suitable for printing processes in which the curing of the printing ink is promoted by using radiation energy sources whose wavelength is not resonant with absorption wavelengths of water. This technique is particularly valuable when printing on paper, cardboard or the like. A narrowband radiation source, in particular a laser, is preferably used for this purpose. This advantageously ensures that the water present in the print medium—and hence also the print medium itself—is not heated or at least not substantially heated. Adverse effects which may be caused by the heating of the print medium, such as, for example, formation of waves or deformation of the print medium, are thus avoided. By means of the IR absorber contained in the print layer, the printed layer is nevertheless heated in a targeted manner and thus cures more rapidly. Details of this technique and apparatuses required for this purpose are described in detail in EP-A 1 302 735, which is to be considered a part of this disclosure. The person skilled in the art chooses from the novel NIR absorbers those which have the best absorption at the wavelength desired in each case.

The novel NIR absorbers can of course be used not only for the preparation of offset or letterpress printing inks but also for other applications, for example as readily soluble IR absorbers in finishes, in particular clear finishes, or for IR filters.

The examples which follow are intended to explain the invention in more detail:

A. Synthesis of the NIR Absorbers

The novel NIR absorbers can be synthesized in a two-stage process. In the first stage, the synthesis of the cyanine cations having conventional anions, such as, for example, iodide, is effected. The synthesis is known in principle to a person skilled in the art and can be carried out by syntheses known from the literature, for example by the methods of K. Vankataraman "The Chemistry of Synthetic Dyes", Academic Press, New York, 1952, Vol. II, and H. Zollinger "Color Chemistry: Synthesis, Properties, and Applications of Organic Dyes and Pigments", Weinheim, Wiley-VCH, 2003.

In a second stage, the conventional anion is exchanged for a novel anion.

1. Stage of Synthesis of Cyanine Cations with Conventional Anions

The synthesis of the absorber 2-[2-[2-[2-(1,3-dihydro-1-ethyl-3-3-dimethyl-2H-indol-2-ylidene)ethylidene]-1-cyclohexen-1-yl]ethenyl]-1-ethyl-3,3-dimethyl-3H-indolium iodide (A1) is described below by way of example.

10 g (0.032 mol) of 3-ethyl-1,1,2-trimethylindolium iodide and 2.7 g (0.016 mol) of 3-hydroxymethylenecyclohex-1-enecarbaldehyde are initially taken in a mixture of 105 ml of butanol and 45 ml of toluene. Heating is effected to 110° C., and the water formed is removed. After stirring for five hours, cooling to room temperature is effected. After the solution has been evaporated down, methyl tert-butyl ether is added. The crystals formed are filtered off with suction and washed with methyl tert-butyl ether. 9.4 g of crystals are obtained and are dried at 50° C. under reduced pressure (m.p. 235° C.).

In an analogous manner, other cyanine cations with conventional anions can be synthesized using corresponding starting compounds. The NIR absorbers A1 to A3 not according to the invention are listed in table 1.

TABLE 1

Synthesized NIR absorbers not according to the invention

| Compound | Structure | Anion |
|---|---|---|
| A1 | | I— |
| A2 | | I— |
| A3 | | I— |

2. Stage of General Method for the Preparation of Novel NIR Absorbers by Exchange of the Anion 2-[2-[2-[2-(1,3-Dihydro-1-ethyl-3-3-dimethyl-2H-indol-2-ylidene)ethylidene]-1-cyclohexen-1-yl]ethenyl]-1-ethyl-3,3-dimethyl-3H-indolium dodecylsulfonate (B1)

The compound was prepared as follows: 0.003 mol (1.6 g) of the NIR absorber A1 is initially taken together with 0.009 mol (2.3 g) of sodium dodecanesulfonate in 50 ml of dichloromethane. 50 ml of water are added, stirring is effected for 30 minutes at room temperature and finally the phases are separated. The organic phase is washed three times with 50 ml of water until iodide is no longer detectable with silver nitrate solution in the wash water. After drying of the organic phase with sodium sulfate, the solvent is distilled off and the residue is dried at 50° C. under reduced pressure.

In an analogous manner, the following NIR absorbers were prepared using other cyanine cations and corresponding salts of the desired anions. The synthesized novel NIR absorbers B1 to B10 are summarized in table 1. For comparative purposes, samples of the corresponding iodides were also retained in each case.

TABLE 2

Synthesized novel NIR absorbers

| Compound | λmax [nm] | Cyanine cation | Anion |
|---|---|---|---|
| B1 (prepared above) | 786 | | |

TABLE 2-continued

Synthesized novel NIR absorbers

| Compound | λmax [nm] | Cyanine cation | Anion |
|---|---|---|---|
| B2 | 786 | | |
| B3 | 810 | | |
| B4 | 810 | | |
| B5 | 832 | | |
| B6 | 810 | | |
| B7 | 762 | | |
| B8 | 823 | | |
| B9 | 676 | | |
| B10 | 768 | | |

B. Testing of the Novel NIR Absorbers in Printing Inks:

Two conventional varnishes for the preparation of offset printing inks were used for the test. Varnishes are prepared formulations comprising binder and solvent, but as yet without colorant. In this way, it is possible to study the behavior of the NIR absorber also spectroscopically without interference by the colorant.

A varnish for the preparation of heatset inks comprising about 45% by weight of a low-aromatics mineral oil (boiling range from 240 to 270° C.), about 45% by weight of a rosin-modified phenol resin and about 10% by weight of an alkyd resin was used, as well as a varnish for the preparation of sheet-fed offset inks comprising about 45% by weight of a low-aromatics mineral oil (boiling range from 260 to 290° C.), about 45% by weight of a rosin-modified phenol resin and about 10% by weight of linseed oil.

In each case defined amounts of the NIR absorbers were added to the binder solutions and stirring was effected for at least 4 hours at 60° C. After the cooling of the samples, polarization microscopy was used to test whether the resulting liquids still comprise undissolved crystals of the NIR absorber.

Furthermore, a thin layer of above liquids was produced and was investigated spectroscopically. For this purpose, the above liquids were diluted 1:5 with dichloromethane, and the resulting solution was applied to a microscope slide by means of a knife coater so that, after evaporation of the dichloromethane, a layer of about 2 μm thick remained. An absorption spectrum (400-1000 nm) of this layer was then recorded after 2 hours.

Result:

The NIR absorbers A1, A2 and A3 not according to the invention were virtually insoluble in both solutions (solubility in each case <<0.01% by weight).

With the novel NIR absorbers B1, B2, B3 and B4, on the other hand, clear solutions without undissolved crystals were obtained even with at least 2% by weight of the corresponding NIR absorber in each case.

The thin layer of the printing varnish containing 1% by weight of the NIR absorber gave an extinction of E<<0.01 at 786 nm in the case of the compound A1 not according to the invention, while an extinction of E=0.91 at 786 nm resulted in the case of the novel compound B1.

An extinction E of <<0.01 at 810 nm was obtained for the compound A2 (1.0% by weight) not according to the invention, while an extinction E of 0.83 at 810 nm was obtained with the novel sample B4 (1.0% by weight).

Testing of the NIR Absorbers in Yellow Offset Printing Ink

COMPARATIVE EXAMPLES

In each case 0.5% by weight of the absorber A1 or A2 not according to the invention was added to a commercial yellow heatset offset printing ink, and the mixtures were thoroughly stirred. The NIR absorber did not dissolve in the offset ink and instead dispersions resulted.

Samples of the inks obtained were printed on paper.

In comparison with a comparative sample without NIR absorber, the print layer on the paper had in each case a brownish green hue instead of a pure yellow hue.

The absorption at a laser wavelength of 786 nm or 810 nm is very low.

EXAMPLES

The procedure was as in the comparative example, except that in each case 0.5% by weight of the novel NIR absorber B2 or B4 was used. The NIR absorbers B2 and B4 each dissolved completely in the offset ink.

In both cases, the print layer on the paper had a yellow hue, which was unchanged in comparison with a sample without NIR absorber.

The absorption at the laser wavelength of 786 nm or 810 nm was high (>60%).

We claim:

1. A printing ink for letterpress and/or offset printing, comprising 5 to 45% by weight of at least one nonpolar solvent with a boiling point of from 200 to 320° C., 20 to 70% by weight of binder, 5 to 25% by weight of colorant absorbing in the visible spectral range and an NIR absorber which has substantially no absorption in the visible spectral range, wherein the solubility of the NIR absorber in the printing ink is at least 0.1% by weight, based on all components of the printing ink, with the proviso that the solubility of the NIR absorber is greater than or equal to the concentration of the NIR absorber in the printing ink, wherein the NIR absorber is an ionic absorber comprising a cyanine cation $X^+$ and a corresponding anion $1/mY^{m-}$, the cyanine cation having a general formula selected from the group consisting of (I) to (IV)

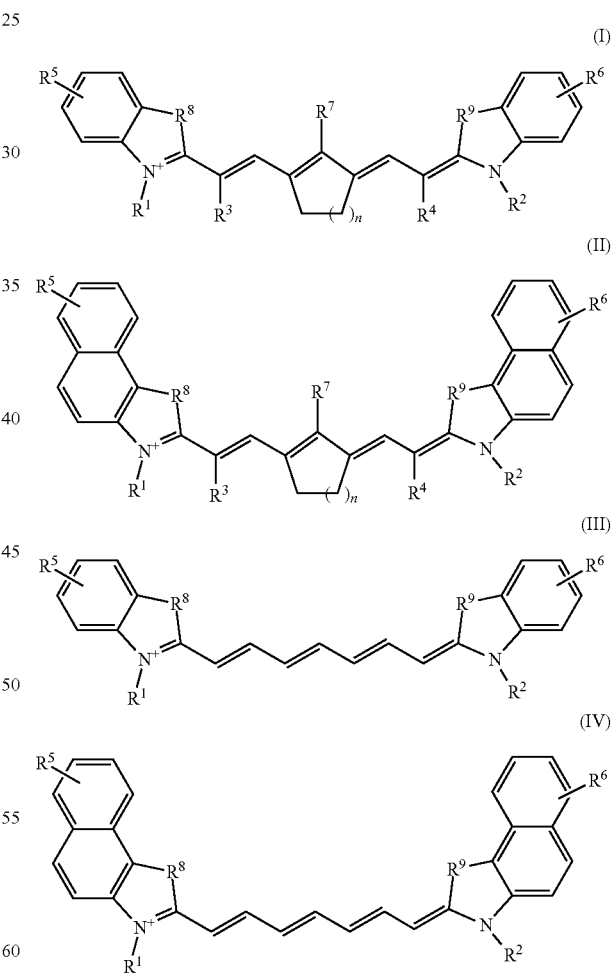

where n is 1 or 2 and the radicals $R^1$ to $R^9$ have the following meanings:

$R^1$ and $R^2$, independently of one another, are a linear or branched, optionally further substituted alkyl or aralkyl radical having 1 to 20 carbon atoms, $R^3$ and $R^4$, independently of one another, are H or CN, $R^5$ and $R^6$, independently of one another, are one or more, identical or different substituents selected from the group consisting of —H, —F, —Cl, —Br, —I, —$NO_2$, —CN, —$CF_3$, —$R^1$, —$OR^1$, aryl- and —O-aryl, $R^7$ is —H, —Cl, —Br, —I, -phenyl, —O-phenyl, —S-phenyl, —N(phenyl)$_2$, -pyridyl, a barbituric acid radical or a dimedone radical, it also being possible for the phenyl radicals to be further substituted, $R^8$ and $R^9$, independently of one another, are >C(CH$_3$)$_2$, —O—, —S—, >$NR^1$ or —CH═CH—, and the anion $Y^{m-}$ has the general formula $[AR^{10}{}_k]^{m-}$ with a polar, ionic head group A and k nonpolar groups $R^{10}$, k is 1, 2 or 3 and m is 1 or 2, and the nonpolar groups $R^{10}$, independently of one another, are at least one selected from the group consisting of linear, branched and cyclic alkyl groups having 6 to 30 carbon atoms and alkylaryl groups of the general formula -aryl-$R^{11}$, where $R^{11}$ is a linear or branched alkyl group having 3 to 30 carbon atoms, or the anion $Y^{m-}$ is a borate anion of the general formulae (V) or (VI)

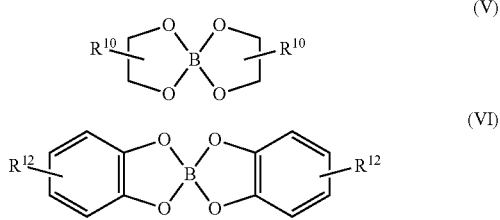

where $R^{10}$ is as defined above and $R^{12}$ is at least one substituent selected from the group consisting of H and linear, cyclic and branched alkyl groups having 1 to 20 carbon atoms, and in the radicals $R^{10}$, $R^{11}$ and $R^{12}$, even nonneighboring carbon atoms may optionally be substituted by O atoms and/or the radicals $R^{10}$, $R^{11}$ and $R^{12}$ may be completely or partly fluorinated, with the proviso that the nonpolar character of the groups is not substantially influenced thereby.

2. The printing ink according to claim 1, wherein the polar, ionic head group A is at least one monobasic or dibasic acid radical selected from the group consisting of —$SO_3^-$, —$OSO_3^-$, —$COO^-$, —$PO_3^{2-}$, —$OPO_3^{2-}$ and (—O)(—O)$PO_2^-$.

3. The printing ink according to claim 1, wherein $R^{10}$ is a linear, branched or cyclic alkyl group having 6 to 12 carbon atoms.

4. The printing ink according to claim 3, wherein $R^{10}$ is a linear alkyl group.

5. The printing ink according to claim 1, wherein $R^{11}$ has 6 to 12 carbon atoms.

6. The printing ink according to claim 5, wherein $R^{11}$ is a linear alkyl group.

7. The printing ink according claim 1, wherein the amount of the NIR absorber in the printing ink is from 0.05 to 4% by weight, based on the sum of all components of the ink.

8. A method of curing the printing ink according to claim 1 in printing processes in which the curing of the printing ink is promoted by utilizing IR radiation sources whose wavelength is not resonant with the absorption wavelengths of water.

\* \* \* \* \*